July 1, 1930.　　　　E. FASSNACHT　　　1,768,588
INDUCTION MOTOR
Filed Feb. 27, 1925　　2 Sheets-Sheet 1
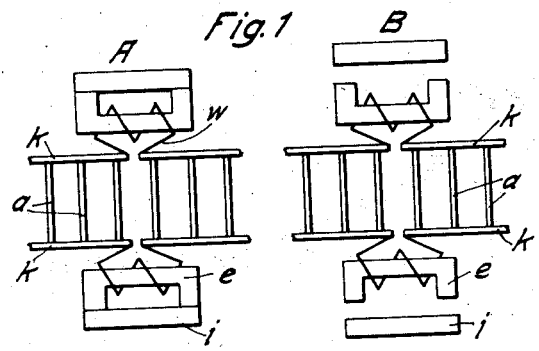
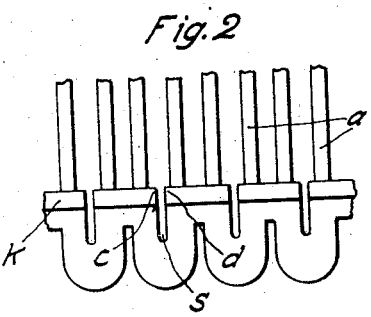
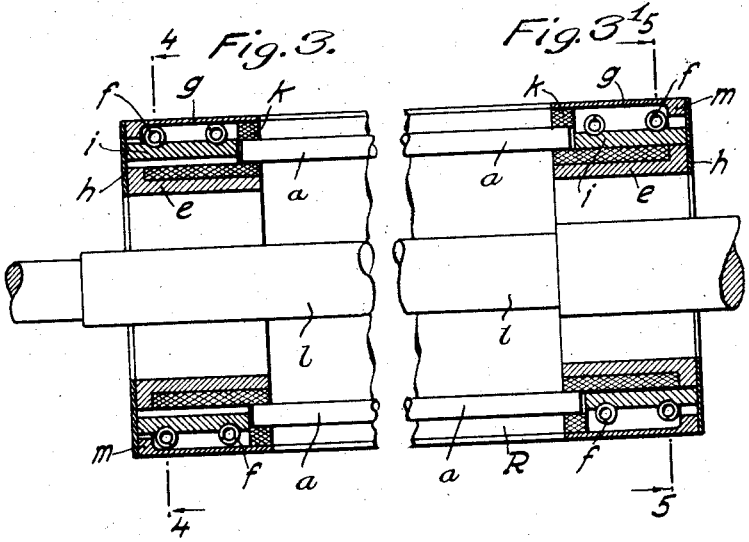
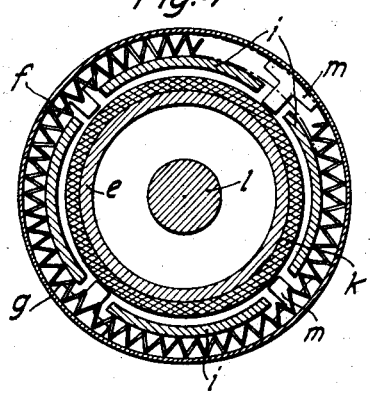
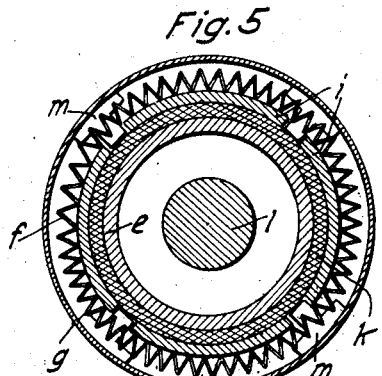
INVENTOR
EMIL FASSNACHT
BY HIS ATTORNEYS
Howson and Howson

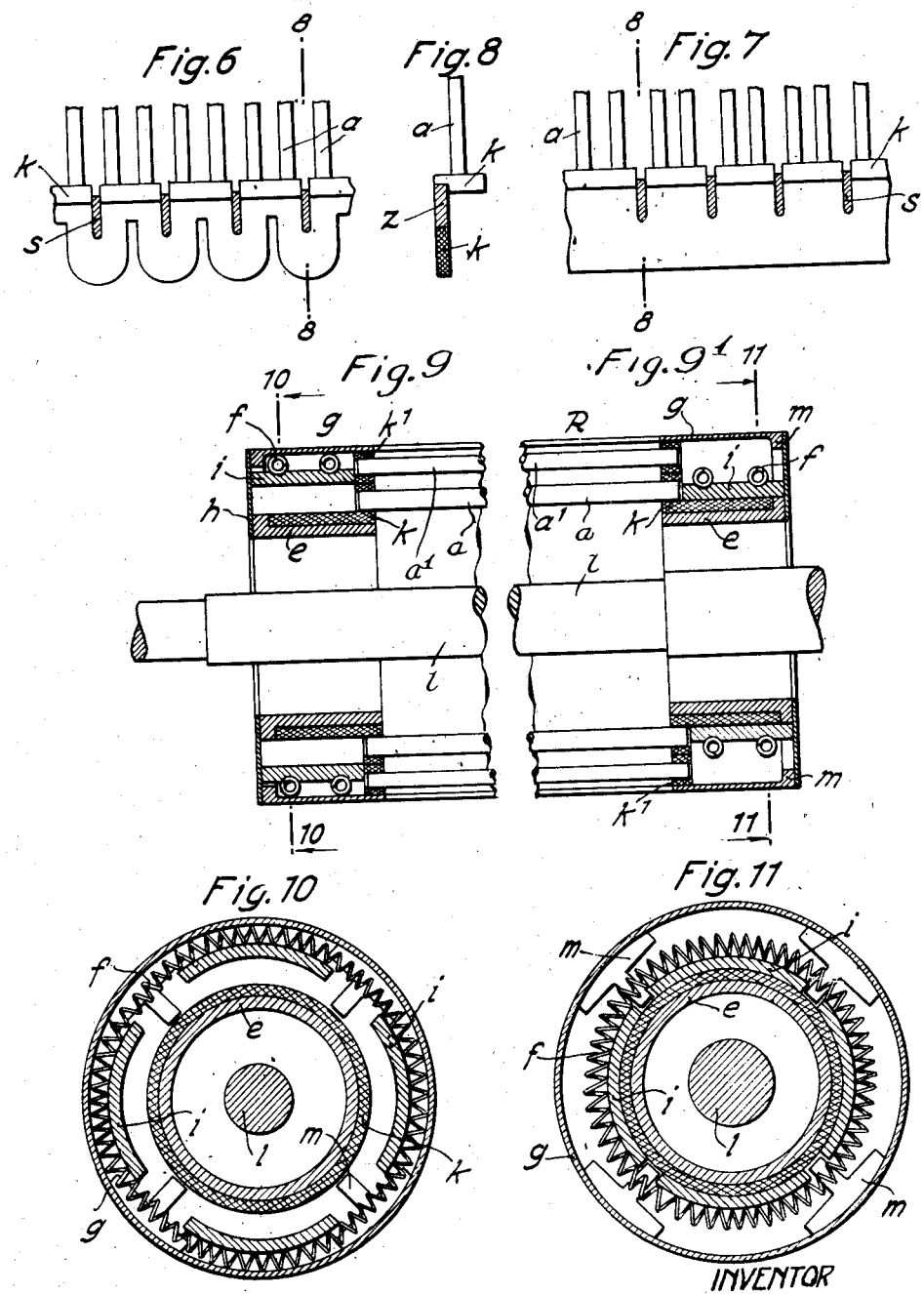

Patented July 1, 1930

1,768,588

UNITED STATES PATENT OFFICE

EMIL FASSNACHT, OF LANDSHUT-ON-THE-JSAR, GERMANY, ASSIGNOR TO THE FIRM BAYERISCHE ELEKTRICITATS-WERKE, OF LANDSHUT-ON-THE-JSAR, GERMANY

INDUCTION MOTOR

Application filed February 27, 1925, Serial No. 12,031, and in Germany March 1, 1924.

This invention relates to improvements in self-starting induction (asynchronous) motors and, more particularly, to the construction of the rotors of such motors, which have the well known squirrel cage form and are provided with one or more secondary coils.

Devices for the starting of induction motors, the fundamental principle in which is the application of leakage starting (that is to say, of inductive resistances) in the secondary circuits are already known in themselves.

The present invention aims to control the straying currents caused by operating the motor, as will be explained.

Cage rotors in accordance with the invention have a high starting resistance, it being characteristic of them that in certain cases adjustable inductive resistances are connected across gaps in the short-circuiting rings of the working cage. The arrangement, however, can also be such that parts of the short-circuiting rings themselves are so constructed as to constitute additional inductive resistances situated between particular conductor bars of the secondary circuit. It is to be understood, however, that the fitting of the additional inductive resistances may be effected in various ways. The short-circuiting rings of the secondary coil may, for example, be slotted and additional inductive resistances may be inserted to bridge over the slots.

The invention is illustrated in this application to two types of rotor in the accompanying drawings in which—

Figure 1 is a diagrammatic illustration of the action of the centrifugally operated additional impedance;

Fig. 2 shows in development how the principle illustrated in Figure 1 can be applied to a rotor having a squirrel cage winding;

Fig. 3 is a partial longitudinal section through a rotor having a single cage and constructed in accordance with the invention, the parts being shown in the positions they occupy with the rotor operating at full speed;

Fig. 3¹ is a partial longitudinal section of a similar rotor, the parts being in the position occupied when the rotor is at rest;

Fig. 4 is a section on the line 4—4 of Fig. 3, illustrating the action of the connector segments under the influence of centrifugal force;

Fig. 5 is a section on the line 5—5 of Fig. 3, showing the position of the connector segments with the rotor at rest;

Figs. 6 and 7 are views, in development, of two types of short-circuiting rings used in the present invention;

Fig. 8 is a section on the line 8—8 of Fig. 6 and Fig. 7;

Fig. 9 is a partial longitudinal section of a rotor having a double cage and constructed in accordance with the invention, the parts being shown in the positions which they occupy with the rotor operating at full speed;

Fig. 9¹ is a partial longitudinal section of the same rotor, the parts being in the positions occupied when the rotor is at rest;

Fig. 10 is a section on the line 10—10 of Fig. 9, illustrating (like Fig. 4) the action of the connector segments and springs under the influence of centrifugal force; and Fig. 11 is a section on the line 11—11 of Fig. 9 showing the position of the connector segments with the rotor at rest.

According to the invention the supplemental inductive resistances in the short-circuiting ring circuit are automatically regulated, and are changed from a high value at starting to such a value within the motor's normal working limits that the power factor is always maintained at a point which is usual in slip ring armatures. The inductive resistance in the short-circuiting ring circuit is accordingly regulated by varying the magnetic closure of the inductive resistances, which for this purpose may be provided with an iron connection or yoke which is automatically withdrawn, either wholly or partially, by the action of centrifugal force.

The present invention eliminates the disadvantage inherent in the well-known Boucherot arrangement by providing the working winding with a variable inductive resistance, the magnitude of which is at starting raised to a high value, but which during normal operation of the motor is reduced to a corresponding low value with a view to obtaining such values of cos Φ as are usual in slip ring armatures.

An advantage of this arrangement is therefore the freedom made possible in choosing the local positions of the two secondary windings, where the increase in the inductive resistance in the working winding at starting is not, as shown in Boucherot's arrangement, determined by the position of this winding in the active iron of the secondary member.

In the drawings, R is the body of the rotor in which are embedded the rotor bars $a$. These bars, together with the short-circuiting rings K, form the secondary winding. By giving an appropriate form to the short-circuiting rings K (see Figs. 6, 7, and 8) the additional and adjustable inductive resistances of the secondary circuit are formed, the special conformation employed being recurrent around the rotor's periphery between definite bars.

The variation in the magnitude of the additional adjustable inductive resistances is effected by iron connector segments $i$, (Figs. 3, 4 and 5) which are capable of being lifted (i. e., being driven outwards) by the action of centrifugal force, against the restraining pressure of springs $f$ which press them down upon the short-circuiting rings $k$ when the motor is stationary. A protector-cap $g$ with parts $m$ is provided, against which the springs $f$ and, with them, the iron connector segments $i$ bear during running. Protector sheets, $h$, $h$ serve also as lateral guides for the parts $i$, while $l$ is the motor shaft. The fixed part of the iron connection is shown at $e$. Iron cores $z$ (Figs. 3, 6, 7, 8 and 9) may be arranged in the slots $s$ of the short-circuiting rings.

Figs. 9, 10 and 11 illustrate the application of the invention to a rotor with two secondary coils, such as the Boucherot construction. Here a second set of rotor bars $a^1$ are embedded in the rotor body, and are connected with a second short-circuiting ring $k^1$. This circuit forms a starting cage of high ohmic resistance in addition to the working cage of low ohmic resistance formed by the bars $a$ and the short-circuiting rings $k$.

The end views of the rotor, illustrated in Figs. 4 and 10, shows the arrangement, when running with the springs $f$ and iron connector segments $i$ lifted toward the parts $m$. Figs. 5 and 11 shows the arrangement when the rotor is at rest.

Figs. 6, 7, and 8 show particular designs of the short-circuiting rings $k$, wherein the short-circuit rings are so constructed, as to form additional inductive resistances regularly spaced between certain rotor bars of the working cage. Slots $s$ in the short-circuiting rings $k$ constrain the induced currents to follow a bent path whereby, in combination with the adjustable iron connector segments $i$, the required choking effect is obtained. The bars of the secondary coil are indicated by $a$. In order to increase the choking effect of the additional impedances the iron cores $z$, fitted in the slots $s$ and firmly connected with that part of the magnetic system indicated as $e$ in Figures 3, 4, and 5 or 9, 10 and 11, may be utilized. Whilst in the construction shown, in Fig. 6 the outer bounding surface of the short-circuiting ring is adjusted to the path to be followed by the induced currents, in Fig. 7, the induced currents may run straight.

Where the word "slot" is employed in the claims it is not to be constructed narrowly, but is to be interpreted as designating any opening performing the same function as the slot.

What I claim is:—

1. In an induction motor, a rotor, a winding comprising rotor bars, and short-circuiting rings having slots formed therein to give the short-circuiting rings inductive resistance, in combination with iron segments bridging the slots and a spring adapted to hold the iron segments in place against said short-circuiting rings when the rotor is at rest, but to permit the iron segments to fly outwardly under the action of centrifugal force when the rotor has attained running speed, substantially as described.

2. In an induction motor, a rotor, a winding comprising rotor bars and short-circuiting rings having slots formed therein to constitute inductive resistances, and a magnetic system including iron cores extending through the slots in said short-circuiting rings, in combination with centrifugally operated means for varying the inductive resistances so formed.

3. In an induction motor, a rotor, a winding comprising rotor bars and short-circuiting rings, having slots formed therein, to constitute inductive resistances, and a magnetic system including iron cores extending through the slots in said short-circuiting rings, in combination with iron segments movable to and from the rings to vary the impedance of the inductive resistances in said rings.

4. In an induction motor, a rotor, a winding comprising rotor bars and short-circuiting rings, having slots formed therein, to constitute inductive resistances, and a magnetic system including iron cores extending through the slots in said short-circuiting rings, in combination with iron segments movable to and from the rings to vary the impedance of the inductive resistances in said rings, and springs pressing said iron segments towards said rings, substantially as described.

In testimony whereof I have signed my name to this specification.

EMIL FASSNACHT.